United States Patent
Caplain et al.

(10) Patent No.: US 7,458,587 B2
(45) Date of Patent: Dec. 2, 2008

(54) SEALING JOINT WITH LAMINATED INTERNAL STRUCTURE FOR VERY HIGH TEMPERATURES

(75) Inventors: Philippe Caplain, Saint Paul Trois Chateaux (FR); Christian Rouaud, Bourg St Andeol (FR); Patrick Le Gallo, Jarrie (FR); Fabienne Le Guyadec, Saint Paul Trois Chateaux (FR); Michel Lefrancois, Saint Etienne (FR); Jean-Marie Gentzbittel, Seyssinet (FR); Richard Levoy, Reauville (FR)

(73) Assignee: Garlock France SAS, Saint Etienne (FR)

( * ) Notice: Subject to any disclaimer, the term of this patent is extended or adjusted under 35 U.S.C. 154(b) by 0 days.

(21) Appl. No.: 10/542,254

(22) PCT Filed: Jan. 13, 2004

(86) PCT No.: PCT/FR2004/050013

§ 371 (c)(1),
(2), (4) Date: Jul. 15, 2005

(87) PCT Pub. No.: WO2004/065826

PCT Pub. Date: Aug. 5, 2004

(65) Prior Publication Data

US 2006/0061046 A1 Mar. 23, 2006

(30) Foreign Application Priority Data

Jan. 16, 2003 (FR) .................................. 03 00441

(51) Int. Cl.
*F16L 17/06* (2006.01)
*F16J 15/02* (2006.01)

(52) U.S. Cl. ........................ 277/611; 277/639; 277/644

(58) Field of Classification Search ................. 277/611, 277/619, 624, 626, 627, 639, 644, 650–652, 277/654, 598, 630, 637
See application file for complete search history.

(56) References Cited

U.S. PATENT DOCUMENTS

| 926,841 | A | * | 7/1909 | Bartlett | 277/535 |
| 2,580,546 | A | * | 1/1952 | Hobson, Jr. | 277/652 |
| 3,230,290 | A | * | 1/1966 | Nelson et al. | 277/652 |
| 3,806,138 | A | | 4/1974 | Herrington | |
| 4,055,464 | A | | 10/1977 | Lemercier | |
| 4,234,638 | A | * | 11/1980 | Yamazoe et al. | 428/133 |
| 4,565,905 | A | * | 1/1986 | Nation | 381/186 |
| 4,901,987 | A | | 2/1990 | Greenhill et al. | |
| 5,407,214 | A | * | 4/1995 | Lew et al. | 277/608 |
| 5,421,594 | A | * | 6/1995 | Becerra | 277/608 |
| 5,427,386 | A | * | 6/1995 | Breaker | 277/627 |
| 5,433,456 | A | * | 7/1995 | Nicholson | 277/644 |
| 5,447,594 | A | * | 9/1995 | Josefsson | 156/307.5 |
| 5,558,347 | A | * | 9/1996 | Nicholson | 277/652 |
| 5,639,074 | A | | 6/1997 | Greenhill et al. | |

(Continued)

*Primary Examiner*—Patricia L Engle
*Assistant Examiner*—Gilbert Y Lee
(74) *Attorney, Agent, or Firm*—Pearne & Gordon LLP

(57) ABSTRACT

A sealing joint comprises, compressed between two parts, a stack of flexible strips separated by offset supports (9); an envelop (1) surrounds this structure (7) and ensures its sealing. Under compression, the strips distort around the supports becoming very stiff for little distortion. Thus, we can rightly be wary of the consequences regarding the relief of strain on the material, notably at high temperatures.

19 Claims, 4 Drawing Sheets

U.S. PATENT DOCUMENTS 6,092,811 A * 7/2000 Bojarczuk et al. ........... 277/627
6,258,457 B1 * 7/2001 Ottinger et al. ............. 428/408
6,436,509 B1 * 8/2002 Demaray et al. ............ 428/141
2005/0100728 A1 * 5/2005 Ristic-Lehmann et al. .. 428/323

* cited by examiner

SEALING JOINT WITH LAMINATED INTERNAL STRUCTURE FOR VERY HIGH TEMPERATURES

TECHNICAL FIELD

The invention considers a sealing joint with plate-like internal structure for very high temperature applications, typically from 600 to 1,000° C.

BACKGROUND

In the field of static sealing of pipe flanges or similar assemblies, likely to be subject to pressure or temperature shocks, we commonly use metallic spring joints which, associated with the tightening of metal flanges onto metal, provide a proper seal as well as a high resistance to stresses exercised through pressure, dilatation or from external forces.

These joints work via constant compressing set by the depth of the housing, or the thickness of a distance ring, fitted between the seating faces of the flanges. They comprise an internal elastic core which generates the counteracting force needed for sealing, and a continuous casing pushing against the flanges and which creates the seal. The elastic elements most commonly used in this field are open or closed tubes, coil springs with joined spires or even different profiles in the shape of a C, U or E.

The core is to preserve the strain through the passing of time under specific mechanical and thermal constraints. Its elastic properties often determine the state of the joint and its service life. Indeed, due to the constant compressing of the joint, it tends to slacken off through time, thereby producing an ever weaker tightening stress. This phenomenon will be amplified under high temperatures.

The slackening can be reduced by limiting the mechanical constraints on the core of the joint by means of dividing the internal structure into several elements each of which being under less constraint. Some examples are given in the patents U.S. Pat. Nos. 4,901,987 and 5,639,074. They consist in non-sagging springs wound in coils. The contact between the successive layers of coils generates the stiffness of the spring. However, the final embodiment of these prior springs does not generate sufficient stiffness for the applications that we are considering due to the continuous nature of the coil, and which, moreover, were not designed for sealing applications.

SUMMARY

The principal objective of the invention is therefore to constitute a sealing joint with an internal elastic element that can preserve its elastic properties under temperatures of between 600 and 1,000° C. over a sufficient service life. A proper elastic stiffness of the joint is accompanied with a good distribution of the forces over its entire structure.

For this reason, the joint in question associates an external metallic casing with an internal elastic structure composed of an assembly of strips brought into contact with each other via staggered supports and sagging under the overall compressing of the joint.

Contrary to what we have seen in the aforementioned patents, the elastic element is composed of separated and overlaid strips which, due to the circular properties of the joint, are folded back on themselves and therefore have individual stiffness greater than that of the spires creating a single strip.

BRIEF DESCRIPTION OF THE DRAWINGS

Several specific embodiments of the invention are shown in the drawings:

drawings 1a and 1b represent two alternatives of a single embodiment of the invention;

Figure 1A:
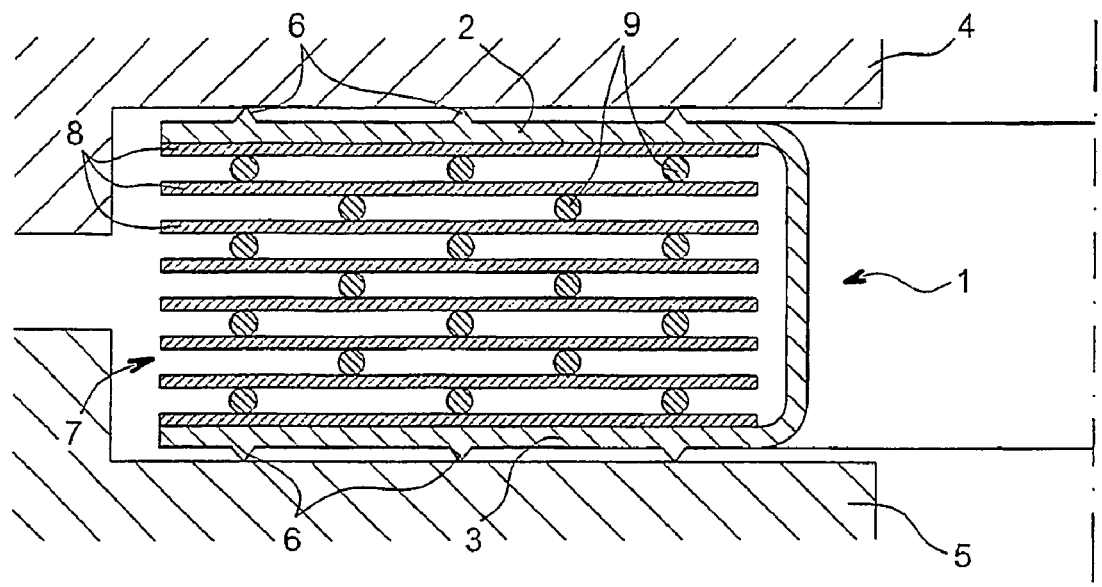
Figure 1B:
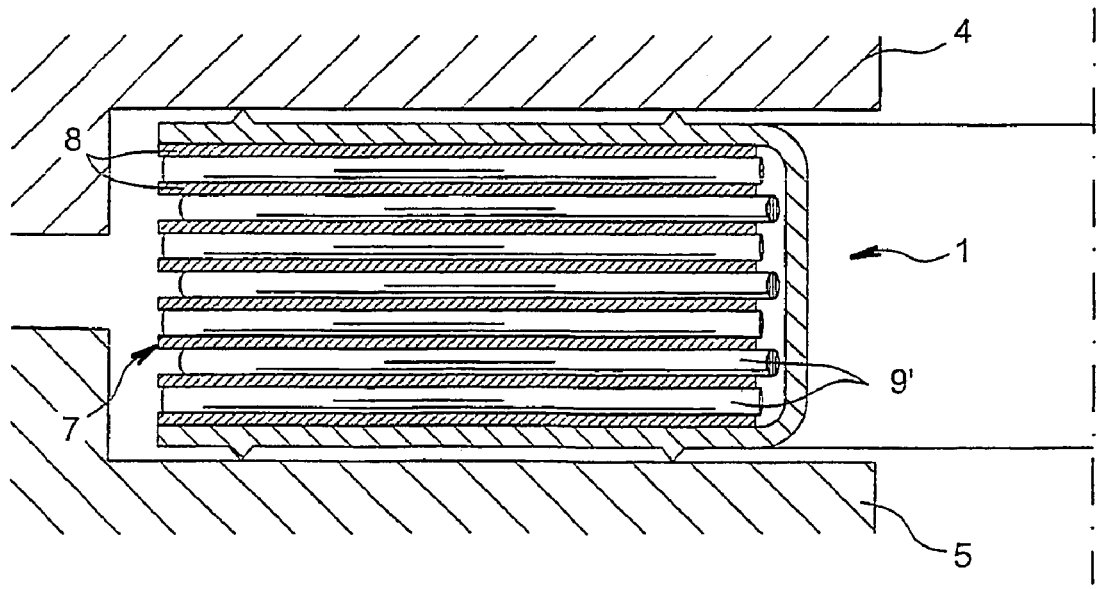
Figure 1C:
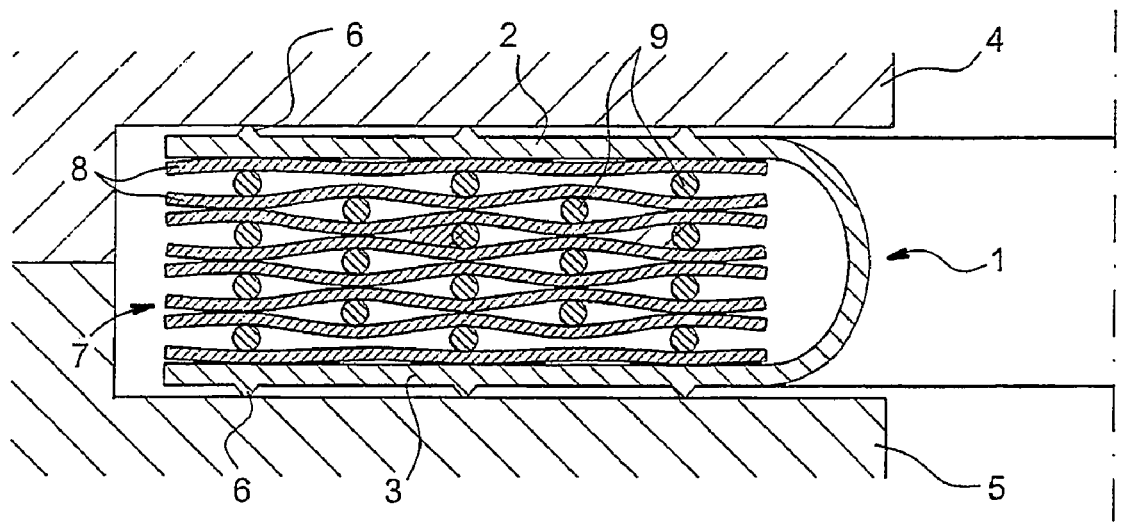
Figure 1D:
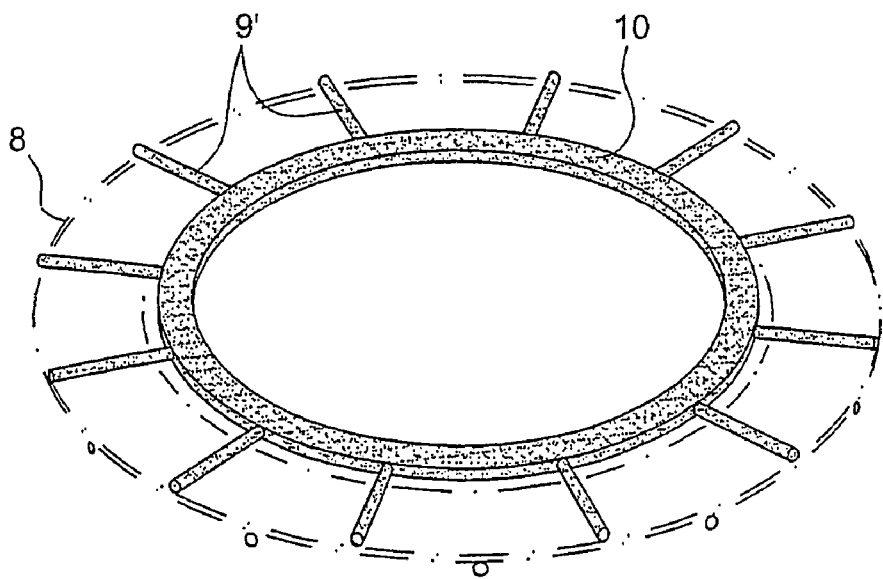
Figure 1E:
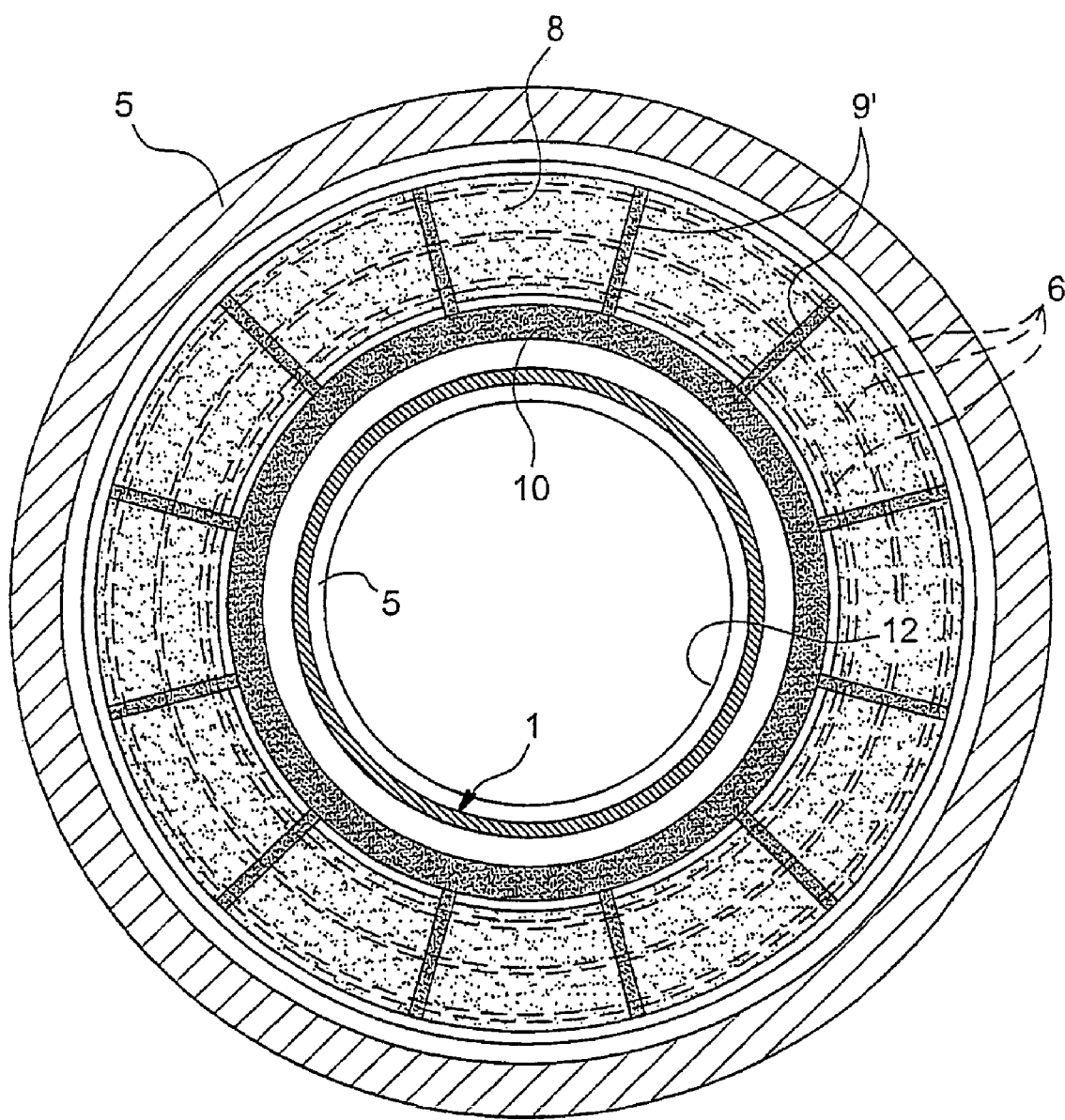
Figure 2A:
Figure 2B:
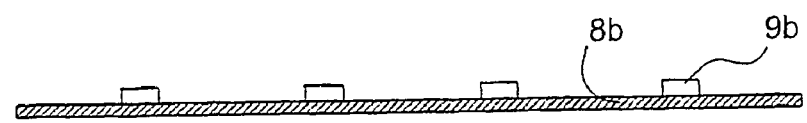
Figure 2C:
Figure 2D:
Figure 2E:
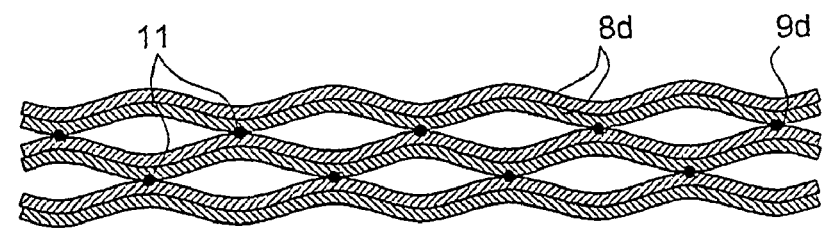

drawing 1c represents the operating mode;

drawing 1d illustrates a specific element of the joint;

drawing 1e illustrates a top and cross section view of the joint;

drawings 2a, 2b, 2c, 2d and 2e illustrate various types of suitable strips.

DETAILED DESCRIPTION

The first embodiment is represented in drawing 1a; it is composed of a metallic casing 1 with, on the exterior of two supporting surfaces 2 and 3 designed to create a seal between two flanges 4 and 5, projections 6 whose edges touch the flanges 4 and 5 so as to focus the tightening stress. It is also composed of an internal structure 7 made of several flexible spring plates 8 pushing against intermediary blocks 9 which separate them.

The core of the joint is therefore composed of alternate layers of strips 8 and blocks 9 in a vertical plane extending from one of the flanges 4 to the other 5. The blocks 9 create a staggered network, being laid out in vertical rows in which they occupy every other space between the strips 8. If we scan the joint in a normal plane with the axis of symmetry of the entire joint, horizontal and parallel to the flanges 4 and 5 between two strips 8, we similarly discover a block 9 every second vertical row that is crossed.

The joint in drawing 1a has a structure known as radial, where the blocks 9 are concentric rings with different radii. To maximise the tightening stress, the rows, that being three in the drawing, where the blocks 9 touch the outer strips 8, their other surface pushing against the support surfaces 2 and 3, will have the same diameter as the projections 6 so as to extend under them, and the other rows of blocks 9 extending half way between the projections 6. The two outer strips 8 touch the metallic casing 1. This contact has a smooth flat link.

Depending on the rigidity of the two outer strips 8, which notably have the role of distributing the counteracting force of the strip structure over the metallic casing 1, the blocks can have other positions.

The joint can also have a structure known as ortho-radial, where the blocks 9' radiate, as illustrated in drawing 1b. Seen from a horizontal cross section through the joint the blocks are still staggered and similar to that in drawing 1a.

The operating of the two structures is substantially the same. The compressing of the joint results in alternating sagging of the strips 8 between the offset blocks 9 or 9'. The strips 8 distort as far as coming into mutual contact with the pairs of blocks 9 or 9', as in drawing 1c which shows the absence of space between the strips 8 alternating with the blocks 9 in each of the vertical rows. This joint core whose stiffness varies depending on the distance between the blocks guarantees good preservation of the tightening stress due to the stress of the strips below their elastic limit at high temperature which does not engender any sagging of the material.

The strip material is to be chosen in accordance with the temperature encountered and the elastic limit. We advise using nickel based super-alloys, alloys with oxide dispersions or ceramics due to the low distortion levels the strips 8 are subject to. The blocks 9 or 9' can be made in the same material. Finally, the material used for the external casing 1 will also be chosen to resist temperatures and according to the type of fluid to be made seal proof. Nickel or iron based alloys can be used due to the capacity to create a layer of oxide which prevents corrosion at high temperatures.

A precise embodiment of the invention can comprise three projections 6 over each of the supporting surfaces 2 and 3 and eight flexible strips 8. The blocks 9 can be composed of circular section wire. The internal structure can be made according to numerous variations which will depend on cost and technical factors in line with the sectional dimensions of the joint or its nominal diameter. The choice of radial or ortho-radial structures will depend on the dimensional and mechanical criteria according to the permitted constraints of the materials being used.

In every case, the blocks 9 or 9' of a single layer can be jointed together by connecting strips. In the case of an ortho-radial structure, these connecting strips consist of two rings or a single ring 10 extending along the side of the strips 8 and joining them, as represented in drawing 1*d*.

This drawing, and all the more so drawing 1*e*, gives the opportunity to assert some of the general aspects of the joint: it is overall circular about a hole 12 made through the flanges 4 and 5; the casing 1 has a U-shaped section closed towards the inside of the circle and the hole 12 but open towards the exterior; the strips 8 are circular with a closed outline, which endows them with good stiffness against distortions through sagging; they are also distinct from each other, being perfectly flat and with a uniform surface in the uncompressed state of the joint; the projections 6 are linear and more precisely circular, and extend around the hole 12; even though this has not been represented, we understand that the blocks 9 of the radial structure in drawing 1*a* will be in the same position as the projections 6 in a similar representation to drawing 1*e*.

A few more embodiments of the invention will be described below.

Drawing 2*a* shows a cross section of a metallic strip 8*a* whose supports 9*a* are not formed by the separated blocks but by folds close to the strip itself. This alternative can be equally radial or ortho-radial.

Drawing 2*b* shows a cross section of a ceramic strip 8*b* whose supports 9*b* are formed by ceramic blocks but bonded to the strip. This alternative appears to be appropriate to the ortho-radial structure.

The overlaying of the strips represented in drawings 2*a*, 2*b* and 2*c* is formed by contacts between the offset supports (folds, ceramic blocks, cord of solder) between the two successive strips.

Drawing 2*c* shows a cross section view of a metallic strip 8*c* whose supports 9*c* are formed by fillings such as cords of solder deposited by a welding apparatus at regular intervals. This alternative can be equally used for radial or ortho-radial structures.

The overlaying of strips represented in drawings 2*a*, 2*b* and 2*c* is formed by contacts between the offset supports (folds, ceramic blocks, cord of solder) between two successive strips.

Drawing 2*d* shows a cross section view of a corrugated metallic strip 8*d* that works in a similar manner to the above strips but allows for additional assemblies via multiple combining so as to vary the stiffness, as shown in drawing 2*e* which illustrates an assembly of strips 8*d* in pairs. This corrugated structure can also be used for ortho-radial or radial structures, as long as the waves are circular or radial. In this type of embodiment, the supports 9*d* are formed by contacts between the facing ridges of the waves of neighbouring strips. Although the distortion of the strips 8*d* is different to that in the previous embodiments, as they flatten out under the stress instead of warping, the operating of the joint will be the same for such an embodiment. Care is to be taken so as to avoid the strips 8*d* from slipping at a tangent. They can then be attached together onto the supports via welds 11, rivets, etc.

The invention claimed is:

1. A sealing joint comprising an external metal casing (1) and a flexible internal structure, the internal structure being made of flexible strips (8, 8*a*, 8*b*, 8*c*, 8*d*), overlaid and separated by supports (9, 9*a*, 9*b*, 9*c*, 9*d*), the supports located on either side of the strips being staggered, wherein the strips are spring plates having an elastic limit, and the supports comprise blocks which are laid out in rows, the rows extending in a first direction which is perpendicular to the strips, the blocks occupying every other space between the strips along the rows and being present at every second row in a second direction which is parallel to the strips, the sealing joint being compressible until the spring plates come to mutual contact between pairs of the supports below the elastic limit.

2. The sealing joint set forth in claim 1, characterised in that some of the supports, which belong to a pair of layers nearest to the casing, extend under projections (6) positioned on an external surface of the casing.

3. The sealing joint set forth in claim 2, characterised in that the supports and the projections are linear.

4. The sealing joint set forth in claim 1, characterised in that the flexible strips are distinct, with a closed outline.

5. The sealing joint set forth in claim 1 further comprising at least one ring connecting together a plurality of said blocks.

6. The sealing joint set forth in claim 1, characterised in that the flexible strips are made in metal, ceramic or alloy with oxide dispersion.

7. The sealing joint set forth in claim 1, characterised in that the flexible strips are circular and flat.

8. The sealing joint set forth in claim 1, characterised in that the supports radiate.

9. The sealing joint set forth in claim 1, characterised in that the supports are concentric rings with differing radii.

10. A sealing joint comprising an external metal casing (1) and a flexible internal structure, the internal structure being made of flexible strips (8*a*, 8*b*, 8*c*, 8*d*) overlaid and separated by supports (9, 9*a*, 9*b*, 9*c*, 9*d*), the supports located on either side of the strips being staggered, wherein the strips are spring plates having an elastic limit, and the supports comprise blocks which are laid out in rows, the blocks each contacting two of the plates, the rows extending in a first direction which is perpendicular to the strips, the blocks occupying every other space between the strips along the rows and being present at every second row in a second direction which is parallel to the strips, the sealing joint being compressible until the spring plates come to mutual contact between pairs to the supports below the elastic limit.

11. The sealing joint set forth in claim 10, characterised in that some of the supports, which belong to a pair of layers nearest to the casing, extend under projections (6) positioned on an external surface of the casing.

12. The sealing joint set forth in claim 11, characterised in that the supports and the projections are linear.

13. The sealing joint set forth in claim 10, characterised in that the flexible strips are distinct, with a closed outline.

14. The sealing joint set forth in claim 10, further comprising at least one ring connecting together a plurality of said blocks.

15. The sealing joint set forth in claim 10, characterised in that the flexible strips are made in metal, ceramic or alloy with oxide dispersion.

16. The sealing joint set forth in claim 10, characterised in that the flexible strips are circular and flat.

17. The sealing joint set forth in claim 10, characterised in that the supports radiate.

18. The sealing joint set forth in claim 10, characterised in that the supports are concentric rings with differing radii.

19. The sealing joint set forth in claim 10, characterised in that the internal structure is an assembly of at least two flexible strips.

* * * * *